United States Patent [19]

Noake

[11] Patent Number: 4,840,781

[45] Date of Patent: Jun. 20, 1989

[54] PROCESS FOR PRODUCING A SILICON CARBIDE

[75] Inventor: Kaneo Noake, Minamata, Japan

[73] Assignee: Chisso Corporation, Japan

[21] Appl. No.: 104,156

[22] Filed: Oct. 5, 1987

[30] Foreign Application Priority Data

Oct. 7, 1986 [JP] Japan .................. 61-238829

[51] Int. Cl.$^4$ ............................................. C01B 31/36
[52] U.S. Cl. ..................................................... 423/345
[58] Field of Search ......................................... 423/345

[56] References Cited

U.S. PATENT DOCUMENTS 4,048,290  9/1977  Lee ..................................... 423/336
4,292,290  9/1981  Tunison .............................. 423/336

FOREIGN PATENT DOCUMENTS 0091027  5/1983  Japan ................................. 423/345

Primary Examiner—John Doll
Assistant Examiner—Lori S. Freeman
Attorney, Agent, or Firm—Leydig, Voit & Mayer

[57] ABSTRACT

A process for producing silicon carbide in the form of uniform fine particles and having a high purity with a good efficiency is provided, which process comprises subjecting an organosilicon compound expressed by the formula;

$$R^1 SiR^2{}_3$$

wherein $R^1$ represents a radial selected from the group consisting of saturated aliphatic hydrocarbon radicals, unsaturated aliphatic hydrocarbon radicals and aromatic hydrocarbon radicals and $R^2$ represents chlorine atom or $OR^3$ group wherein $R^3$ represents an alkyl group of 1 to 4 carbon atoms to hydrolysis to obtain a hydrolyzate of said organosilicon compound having fluidity at normal temperatures, followed by calcining the hydrolyzate in an inert gas atmosphere.

4 Claims, No Drawings

PROCESS FOR PRODUCING A SILICON CARBIDE

BACKGROUND OF THE INVENTION

1. Field of the Invention

This invention relates to a process for producing silicon carbide. More particularly it relates to a process for producing silicon carbide by subjecting a specified organosilicon compound to hydrolysis to obtain a hydrolyzate, followed by calcining this hydrolyzate.

2. Description of the Related Art

In recent years, sintered silicon carbide having a high strength, superior heat resistance, oxidation resistance and abrasion resistance has come to be obtained so that is has found application not only to abrasive materials, refractories, heating elements utilizing semiconductivity, etc., but also to mechanical parts and structural units such as engines for automobiles, mechanical seals, etc. have been developed. Further, its fibers and whiskers have been used as a raw material for fiber-reinforcing composite materials or as other reinforcing materials and also have been utilized for forming heat-resistant and abrasion-resistant protective films.

As to the process for producing silicon carbide, a number of production processes have so far been disclosed such as reduction of silica with carbon (Japanese patent publications Nos. Sho 58-20885/1983 and Sho 58-48487/1983), reaction of silica with carbon (Japanese patent publication No. Sho 55-29005/1980, Japanese patent application laid-open No. Sho 60-77114/1985), decomposition-reaction of a silicon-containing gas with a carbon-containing gas by means of plasma (Japanese patent application laid-open No. Sho 57-175718/1982), reaction of a silicon-containing gas with a carbon-containing gas by means of plasma (Japanese patent publication No. Sho 58-25045/1983), a process of subjecting an alkoxysilane compound to gas phase reaction, followed by heat treatment (Japanese patent application laid-open No. Sho 61-44708/1986), etc.

However, any of these conventional processes have the following drawbacks. Difficulty in uniform mixing of two or more kinds of powdery solids in liable to have a bad influence upon the yield and purity of product. A high initial cost is required corresponding to gas reaction at high temperatures or by-production of corrosive gas. In the case of gas phase reaction, since the reaction is instantaneously carried out under severe conditions, carbon remains or the yield is inferior. To be effective for such gas-phase reactions, the respective raw materials should be previously gasified, and in some case, they should be uniformly mixed with the atmospheric gas, followed by feeding these so as not to cause a turbulent flow. Further, handling of a cohesive high temperature gas is troublesome.

SUMMARY OF THE INVENTION

The object of the present invention is to provide a process which is capable of easily obtaining silicon carbide in the form of fine particles and having a high purity with a good efficiency, unlike the reaction of two or more kinds of solid phase powders or reaction in gas phase.

The present invention resides in;
a process for producing silicon carbide which comprises subjecting an organosilicon compound expressed by the formula $$R^1SiR^2_3$$

wherein $R^1$ represents a radical selected from the group consisting of saturated aliphatic hydrocarbon radicals, unsaturated aliphatic hydrocarbon radicals and aromatic hydrocarbon radicals, each of 3 to 10 carbon atoms, and $R^2$ represents chlorine atom, or $OR^3$ group wherein $R^3$ represents an alkyl group of 1 to 4 carbon atoms to hydrolysis to obtain a hydrolyzate of said organosilicon compound flowable at normal temperatures, followed by calcining said hydrolyzate in an inert gas atmosphere.

DETAILED DESCRIPTION OF PREFERRED EMBODIMENTS

The carbon number of the above $R^1$ is 3 to 10, preferably 5 to 8. If the number is less than 3, there is a fear that oxygen of Si-O bond remains in the resulting silicon carbide, while if it exceeds 10, the viscosity of the hydrolyzate obtained by hydrolysis of the organosilicon falls outside its suitable range and there is a fear that carbon remains in the resulting silicon carbide.

Examples of such $R^1$ are butyl group, isopentyl group, allyl group, butenyl group, pentenyl group, phenyl group, phenetyl group, etc. Examples of $R^2$ are chlorine atom, methoxy group, ethoxy group, n-propoxy group, isopropoxy group, n-butoxy group, isobutoxy group, etc.

The process of the hydrolysis employed in the present invention has no particular conditions, but it is carried out to give a viscosity of the hydrolyzate of the organosilicon in the range of 50 to $5 \times 10^5$ cP at 25° C., preferably 500 to $5 \times 10^4$ cP at 25° C. If it is less than 50 cP, there is a fear that the yield of silicon carbide is inferior, while if it exceeds $5 \times 10^5$ cP, the particle size of silicon carbide becomes too large to obtain silicon carbide in the desirable form of fine particles. Further, hydrolyzate having a high viscosity is difficult to handle. The hydrolyzate of said organosilicon compound comprises $R^1Si(OH)R^2_2$, $R^1Si(OH)_2R^2$, $R^1Si(OH)_3$ and condensation products thereof. The viscosity of the hydrolyzate can be controlled by changing the reaction time for hydrolysis and the water content. A preferable water content is in the range of 70% to 100% by weight of the theoretical amount.

Next, the hydrolyzate of the organosilicon is calcined in an inert gas atmosphere. The inert gas used has no particular limitation, but those which are non-reactive with the hydrolyzate of the organosilicon or silicon carbide are used. If oxygen gas is used, silicon oxide (silica) is formed and if nitrogen gas is used, silicon nitride is formed; hence these gases are unsuitable. Examples of inert gases preferably used are those belonging to 0 group of the Periodic table, i.e. helium, neon, argon and xenon, and besides, $CO_2$ gas. The calcination temperature is preferably in the range of 1,400° to 2,000° C., more preferably 1,400° to 1,800° C. If the temperature is too low, the reaction of forming silicon carbide does not sufficiently proceeds so that unreacted hydrolyzate of the organosilicon remains and also a long time is required for the reaction. Further, if the temperature is too high, the particle size of silicon carbide increases and there is a fear of its partial cohesion.

The present invention will be described in more detail by way of Examples and Comparative example.

EXAMPLE 1

To propyltriethoxysilane heated to 60° C. was dropwise added a 1% by weight hydrochloric acid aqueous solution containing water in a quantity of 70% by weight of its theoretical amount, over 30 minutes, followed by agitating the mixture for 3 hours for hydrolysis, removing hydrochloric acid from the resulting hydrolyzed solution by washing with water and thereafter distilling off a low boiling component under reduced pressure to obtain a hydrolyzate having a viscosity of 2,900 cP. This hydrolyzate of the organosilicon (16 g) was placed in an alumina crucible and further placed in a calcination oven, followed by reducing the pressure inside the calcination oven to 3 mm Hg by means of a vacuum pump, thereafter returning the pressure to 760 mmHg with argon gas, repeating this procedure 7 times, thereafter raising the temperature while feeding argon gas into the oven under 760 mmHg at a rate of 1 Nl/min, keeping the temperature at 1,600° C. for 4 hours after it reached 1,600° C., thereafter lowering the temperature and taking out the reaction product (5.5 g). This reaction product was confirmed to be β-SiC according to X-ray diffraction. When it was observed by an electron microscope, the whole particles had a particle size of 0.5 μ or less. Further, its yield was 34% by weight based on the weight of the hydrolyzate of the organosilicon.

EXAMPLE 2

To isopentyltrichlorosilane heated to 50° C. was dropwise added a 1% by weight hydrochloric acid aqueous solution containing water in a theoretical amount, in the presence of toluene as solvent over one hour, followed by agitating the mixture at the same temperature for 5 hours for hydrolysis, removing hydrochloric acid by washing with water, and thereafter distilling off toluene and a low boiling component to obtain a hydrolyzate having a viscosity of 15,800 cP. This hydrolyzate of the organosilicon (9.2 g) was treated in the same manner as in Example 1, followed by keeping the temperature at 1,650° C. for 2 hours after it reached 1,650° C., thereafter lowering the temperature as in Example 1 and taking out the reaction product (0.48 g). This product was confirmed to be β-SiC according to X-ray diffraction. When it was observed by means of an electron microscope, the whole particles had a particle size of 0.5μ or less. Further, its yield was 5.2% by weight based on the weight of the hydrolyzate of the organosilicon.

Comparative example 1

To propyltriethoxysilane was added a 1% by weight hydrochloric acid aqueous solution containing water in a quantity of three times its theoretical amount, followed by agitating the mixture at 80° C. for 8 hours to obtain a hydrolyzate, finely grinding this hydrolyzate, washing it with water and drying under reduced pressure to obtain a solid hydrolyzate. The thus obtained hydrolyzate was treated and calcined in the same manner as in Example 2 to obtain a calcined product in a block form. This product was confirmed to be β-SiC according to X-ray diffraction, but free carbon was present and its purity was insufficient.

As described above, the process of the present invention is superior in operability and can produce silicon carbide in the form of uniform fine particles with a good purity and efficiency. The resulting product is used preferably for mechanical parts and structural materials having superior heat resistance.

What we claim is:

1. A process for producing silicon carbide which comprises subjecting an organosilicon compound expressed by the formula:

$$R^1SiR^2_3$$

wherein $R^1$ represents a radical selected from the group consisting of saturated aliphatic hydrocarbon radicals, unsaturated aliphatic hydrocarbon radicals and aromatic hydrocarbon radicals, each having a carbon number of 3 to 10, and $R^2$ represents a chlorine atom or $OR^3$ group wherein $R^3$ represents an alkyl group of 1 to 4 carbon atoms to hydrolysis to obtain a liquid hydrolyzate of said organosilicon compound having a viscosity of 50 to $5 \times 10^5$ cP at 25° C., followed by calcining said hydrolyzate in an inert gas atmosphere.

2. A process for producing silicon carbide according to claim 1 wherein the temperature of said calcination is in the range of 1,400° to 2,000° C.

3. A process for producing silicon carbide according to claim 1 wherein said hydrolysis is carried out with water content in the range of 70% to 100% by weight of its theoretical amount.

4. A process for producing silicon carbide according to claim 3 wherein said hydrolysis is carried out at the temperature in the range of 50° C to 60° C.

* * * * *